United States Patent
Hamaoka et al.

(10) Patent No.: US 9,749,061 B2
(45) Date of Patent: Aug. 29, 2017

(54) DIGITAL SIGNAL PROCESSING DEVICE

(71) Applicant: NIPPON TELEGRAPH AND TELEPHONE CORPORATION, Tokyo (JP)

(72) Inventors: Fukutaro Hamaoka, Musashino (JP); Takeshi Seki, Musashino (JP); Toshiya Matsuda, Musashino (JP); Akira Naka, Musashino (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 12 days.

(21) Appl. No.: 14/426,054

(22) PCT Filed: Jul. 18, 2013

(86) PCT No.: PCT/JP2013/004398
§ 371 (c)(1),
(2) Date: Mar. 4, 2015

(87) PCT Pub. No.: WO2013/038121
PCT Pub. Date: Mar. 13, 2014

(65) Prior Publication Data
US 2015/0236796 A1    Aug. 20, 2015

(30) Foreign Application Priority Data
Sep. 5, 2012  (JP) ................................. 2012-195209

(51) Int. Cl.
*H04B 10/61* (2013.01)
*H04L 27/22* (2006.01)
*H04L 27/227* (2006.01)

(52) U.S. Cl.
CPC ....... *H04B 10/6165* (2013.01); *H04L 27/223* (2013.01); *H04L 27/227* (2013.01)

(58) Field of Classification Search
None
See application file for complete search history.

(56) References Cited

U.S. PATENT DOCUMENTS

| 5,896,420 A * | 4/1999 | Kaku | H04B 1/586 370/286 |
| 2011/0129041 A1* | 6/2011 | Ishihara | H04B 7/084 375/340 |

FOREIGN PATENT DOCUMENTS

| JP | H07-184048 A | 7/1995 |
| JP | H07-245585 A | 9/1995 |
| JP | 2005-303753 A | 10/2005 |

OTHER PUBLICATIONS

Seb J. Savory, "Digital filters for coherent optical receivers," Optics Express, Jan. 9, 2008, vol. 16, Issue 2, pp. 804-817.

(Continued)

*Primary Examiner* — Darren E Wolf
(74) *Attorney, Agent, or Firm* — Harness, Dickey & Pierce, P.L.C.

(57) ABSTRACT

A digital signal processor which performs digital signal processing of a digital signal includes a statistical analysis method which calculates a moving average and a standard deviation from the digital signal, performs statistical decision deciding whether or not the digital signal is within a predetermined range obtained from the moving average and the standard deviation, and corrects the digital signal outside the range within the range. Statistical analysis of the digital signal is performed, thereby suppressing transient changes without increasing the number of times of averaging during the digital signal processing.

7 Claims, 3 Drawing Sheets

(56) References Cited

OTHER PUBLICATIONS

Satoshi Tsukamoto et al., "Optical Homodyne Receiver Comprising Phase and Polarization Diversities with Digital Signal Processing", Proceedings of European Conference on Optical Communication, Sep. 24-28, 2006.
Takashi Mizuochi et al., "Progress in Soft-Decision FEC", OSA/OFC/NFOEC, NWC2, Mar. 6-10, 2011.
International Search Report for PCT/JP2013/004398, ISA/JP, mailed Oct. 1, 2013.
International Preliminary Report on Patentability, Application No. PCT/JP2013/004398, Mar. 19, 2015.
Notification of Reasons for Refusal, Japanese Patent Application No. 2014-534161, Apr. 5, 2016.
Chinese Office Action regarding corresponding application CN 201380040215.X, CIPO, mailed Sep. 30, 2016, with a machine translation thereof.

* cited by examiner

DIGITAL SIGNAL PROCESSING DEVICE

CROSS REFERENCE TO RELATED APPLICATIONS

This application is a U.S. National Stage application claiming the benefit of prior filed International Application Number PCT/JP2013/004398, filed on Jul. 18, 2013, in which the International Application claims priority from Japanese Patent Application Number 2012-195209, filed on Sep. 5, 2012, the entire contents of which are incorporated herein by reference.

TECHNICAL FIELD

The present application relates to a digital signal processor which suppresses transient changes in a digital signal.

BACKGROUND ART

In a digital signal processor, an analog signal is converted to a digital signal by an AD (Analog to Digital) converter, and digital signal processing is performed on the digital signal, whereby, for example, a received waveform distorted in a transmission line can be compensated in a digital region. The digital signal processor is used in various technical fields, such as image processing, sound processing, wireless communication, and optical communication.

When performing the digital signal processing, if transient changes, such as pulse noise, occur in the digital signal during the digital signal processing, errors in the digital signal processing increase and the quality of an output signal is deteriorated. However, the influence of the transient change components on the digital signal processing can be reduced by, for example, averaging processing of the digital signal using a low pass filter.

For example, in a digital coherent receiver in an optical communication field, in order to reduce the influence of the transient changes, there is a method which, when performing equalization processing on a received waveform using a FIR (Finite Impulse Response) filter, increases the number of taps of FIR filters. Alternatively, there is a method which estimates the phase shift from the phase point of the phase modulation signal using an M-power algorithm, and when removing the phase shift, increases the cumulative number of signals (the number of taps) of the M-power algorithm.

Here, a digital coherent receiver which uses a coherent optical communication technique and a digital signal processing technique in combination will be described.

FIG. 5 shows a configuration example of a digital coherent transmission/reception system (Non-Patent Document 1).

In FIG. 5, the digital coherent transmission/reception system has a transmitter 100 which transmits a phase-modulated optical signal, and a digital coherent receiver 200 which receives and demodulates the optical signal transmitted through a transmission line. The digital coherent receiver 200 has a coherent receiver 210, an AD converter 220, and a digital signal processor 230. The coherent receiver 210 inputs the optical signal received from the transmission line and local light from an optical local oscillator 301 and converts the optical signal to an electrical signal by a coherent detection technique with high sensitivity. The AD converter 220 converts the electrical signal output from the coherent receiver 210 to a digital signal. The digital signal processor 230 performs digital signal processing on the digital signal output from the AD converter 220 and demodulates the digital signal while compensating for a received waveform distorted in the transmission line.

The digital signal processor 230 has an equalizer 231, a phase shift compensator 232, and a demodulator 233. The equalizer 231 equalizes waveform distortion of the input digital signal, and the phase shift of the waveform-equalized digital signal is compensated by the phase shift compensator 232. The demodulator 233 outputs the phase shift-compensated digital signal output from the phase shift compensator 232 as a symbol string. In this way, since the correction of the waveform distortion can be performed with a simple configuration, a large-capacity and high-speed transmission system can be realized.

The phase shift compensator 232 can estimate and correct the phase shift using, for example, the M-power algorithm (Non-Patent Document 2). Since the estimation range of the phase shift in the M-power algorithm is limited within the range of $\pm\pi/4$ from a reference point for a QPSK (Quadrature Phase Shift Keying) signal, a phase shift outside the range cannot be estimated. A phenomenon in which the time continuity of the phase shift estimation values is not maintained is called a "cycle slip", and signal quality is deteriorated. For example, when transient changes like pulse noise occur in the digital signal, time continuity is not maintained due to the error expansion of the digital signal processing, and as shown in FIG. 6, a cycle slip occurs.

As a countermeasure against the cycle slip, a method which performs logical differential coding on a transmission signal to prevent the propagation of the influence, or the like is used (Non-Patent Document 3). However, bit errors at the moment when the cycle slip occurs cannot be prevented. When one bit error occurs in differentially coded data, since the bit error is subjected to differential decoding as continuous two bit errors, transmission quality is deteriorated.

Non-Patent Document 1: S. J. Savory, "Digital filters for coherent optical receivers" Optics Express, vol. 16, no. 2, pp. 804-814, 2008

Non-Patent Document 2: S. Tsukamoto, Y. Ishikawa, and K. Kikuchi, "Optical Homodyne Receiver Comprising Phase and Polarization Diversities with Digital Signal Processing" Proc. ECOC, 2006

Non-Patent Document 3: T. Mizuochi, Y. Miyata, K. Kubo, T. Sugihara, K. Onohara and H. Yoshida, "Progress in Soft-Decision FEC" OSA/OFC/NFOEC, NWC2, 2011

DISCLOSURE

Problems to be Solved

While it is possible to cope with the transient changes of the digital signal, such as the phase shift from the phase point of the phase modulation signal, by performing averaging of the digital signal, averaging causes an increase in delay amount during signal processing, degradation of followability, or the like.

A proposition of the present application is to provide a digital signal processor capable of suppressing transient changes of a digital signal by performing statistical analysis of the digital signal without increasing the number of times of averaging during digital signal processing.

Means for Solving the Problems

The present application provides a digital signal processor which performs digital signal processing of a digital signal, the digital signal processor including a statistical analysis method calculating a moving average and a standard deviation from the digital signal, performing statistical decision deciding whether or not the digital signal is within a predetermined range obtained from the moving average and the standard deviation, and correcting the digital signal outside the range to be within the range.

In the digital signal processor of the present application, the statistical analysis method includes a moving average calculation block which inputs the digital signal and outputs the moving average, a standard deviation calculation block which inputs the digital signal and the moving average output from the moving average calculation block and outputs the standard deviation, and a statistical decision/signal correction block which inputs the digital signal, the moving average, and the standard deviation, corrects the digital signal by the statistical decision for the digital signal, and outputs the digital signal being corrected.

In the digital signal processor of the present application, when n is an integer equal to or greater than 3 and L is an integer equal to or greater than 2, the moving average calculation block inputs digital signals of L points in total from an (n−L)th digital signal S(n−L) to an (n−1)th digital signal S(n−1) and outputs a moving average A(n−1); the standard deviation calculation block inputs the digital signals of the L points to the (n−1)th digital signal and the moving average A(n−1) output from the moving average calculation block and outputs a standard deviation σ(n−1); and the statistical decision/signal correction block inputs an n-th digital signal S(n), the moving average A(n−1) output from the moving average calculation block, and the standard deviation σ(n−1) output from the standard deviation calculation block, performs the statistical decision deciding, with an arbitrary positive number as x, whether or not the digital signal S(n) is within a range of:

$$A(n-1)-x\sigma(n-1) \leq S(n) \leq A(n-1)+x\sigma(n-1)$$

outputs the digital signal S(n) as it is when the digital signal S(n) is within the range, and corrects the digital signal S(n) to be within the range when the digital signal S(n) is outside the range and outputs the corrected digital signal S(n).

Effect

The present application corrects a digital signal by statistical decision for the digital signal during digital signal processing, thereby suppressing transient changes of the digital signal and improving stability of the digital signal processing.

DETAILED DESCRIPTION OF THE EMBODIMENTS

Figure 1:
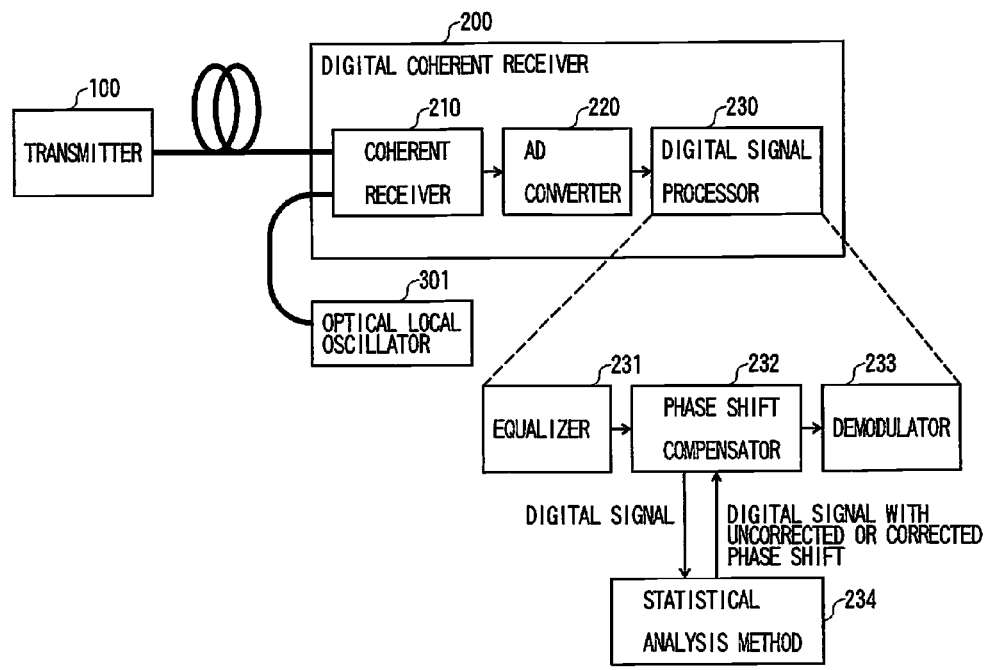
FIG. 1 is a diagram showing a configuration example of a digital signal processor of the present application.

FIG. 1 shows a configuration example of a digital signal processor of the present invention. Here, although an example where a digital signal processor is applied to a digital coherent receiver 200 of a digital coherent transmission/reception system shown in FIG. 5 will be described, the invention is not limited to a digital signal processor 230 of the digital coherent receiver 200. In the present embodiment, although a technique for suppressing transient changes of a digital signal, such as the phase shift from the phase point of the phase modulation signal, will be described, for example, the invention can be similarly applied to general digital signal processing for suppressing transient noise during sound signal processing.

Figure 5:
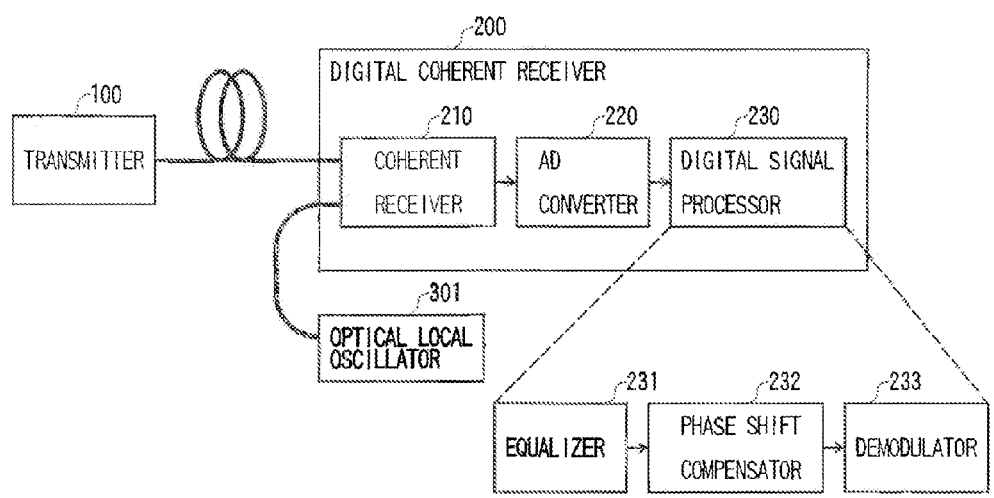
FIG. 5 is a diagram showing a configuration example of a digital coherent transmission/reception system.

In FIG. 1, a transmitter 100, a digital coherent receiver 200, an optical local oscillator 301, a coherent receiver 210, an AD converter 220, and a digital signal processor 230 of the digital coherent receiver 200, and an equalizer 231, a phase shift compensator 232, and a demodulator 233 of the digital signal processor 230 have the same functions as the configuration shown in FIG. 5.

The digital signal processor 230 of the present embodiment has a feature in which a statistical analysis method 234 is connected to the phase shift compensator 232, thereby suppressing transient changes of a digital signal, such as the phase shift from the phase point of the phase modulation signal, and securing time continuity of the phase modulation signal. That is, a digital signal which exhibit a phase shift output from the phase shift compensator 232 are input to the statistical analysis method 234, and the statistical analysis method 234 returns the digital signal with the uncorrected or corrected phase shift by statistical analysis processing described below to the phase shift compensator 232. The phase shift compensator 232 compensates for the phase shift of the digital signal input from the equalizer 231 using the digital signal with the uncorrected or corrected phase shift input from the statistical analysis method 234 and outputs the compensated digital signal to the demodulator 233.

Figure 2:
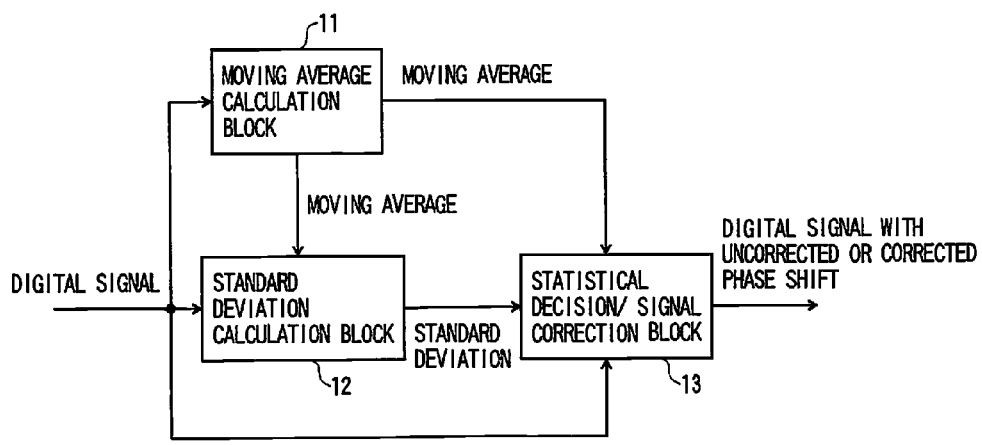
FIG. 2 is a diagram showing a configuration example of a statistical analysis method 234.

FIG. 2 shows a configuration example of the statistical analysis method 234.

In FIG. 2, the statistical analysis method 234 includes a moving average calculation block 11 which calculates a moving average of the input a digital signal, a standard deviation calculation block 12 which calculates a standard deviation from the input digital signal and the moving average, and a statistical decision/signal correction block 13 which performs statistical decision for the digital signal described below using the moving average and the standard deviation of the digital signal and outputs the digital signal with the uncorrected or corrected phase shift.

The moving average calculation block 11 inputs digital signals of L points in total from an (n−L)th digital signal S(n−L) to an (n−1)th digital signal S(n−1) when n is an integer equal to or greater than 3 and L is an integer equal to or greater than 2, and calculates a moving average A(n−1).

The standard deviation calculation block 12 inputs the digital signals of the L points from the (n−L)th digital signal to the (n−1)th digital signal and the moving average A(n−1) output from the moving average calculation block 11 and calculates a standard deviation σ(n−1).

The statistical decision/signal correction block 13 inputs the n-th digital signal S(n), the moving average A(n−1) output from the moving average calculation block 11, and the standard deviation σ(n−1) output from the standard deviation calculation block 12, performs the statistical decision deciding, with an arbitrary positive number as x, whether or not the digital signal S(n) is within a range of:

$$A(n-1)-x\sigma(n-1) \leq S(n) \leq A(n-1)+x\sigma(n-1)$$

outputs the phase shift of the digital signal S(n) as it is when the digital signal S(n) is within the range, and corrects the phase shift of the digital signal S(n) to be within the range and outputs the corrected phase shift of the digital signal S(n) when the digital signal S(n) is outside the range.

Here, when x=2, the above-described range is:

$$A(n-1)-2\sigma(n-1) \leq S(n) \leq A(n-1)+2\sigma(n-1)$$

For example, when the digital signal S(n) is smaller than A(n−1)−2σ(n−1), it is corrected to:

$$S(n)=A(n-1)-2\sigma(n-1)$$

and when the digital signal S(n) is greater than A(n−1)+2σ(n−1), it is corrected to:

$$S(n)=A(n-1)+2\sigma(n-1)$$

With this, it is possible to remove the transient changes of the digital signal.

A moving average A(m) and a standard deviation σ(m) of the digital signals of the L points to the m-th digital signal can be respectively calculated by the following expressions.

$$A(m) = \frac{1}{L} \sum_{k=m-L+1}^{m} S(k) \quad \text{[Equation 1]}$$

$$\sigma(m) = \sqrt{\frac{1}{L} \sum_{k=m-L+1}^{m} (S(k) - A(m))^2}$$

Figure 3:
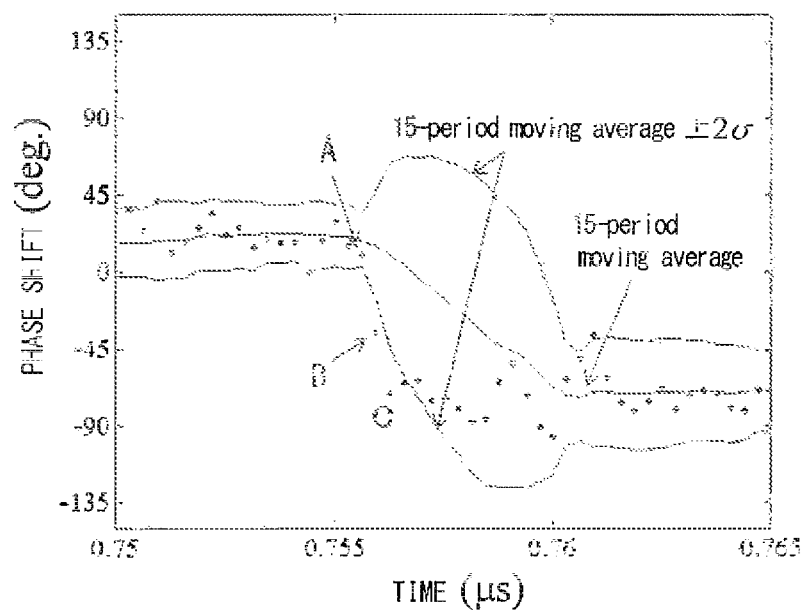
FIG. 3 is a diagram showing a processing example of the statistical analysis method 234 which corrects a phase shift.
Figure 6:
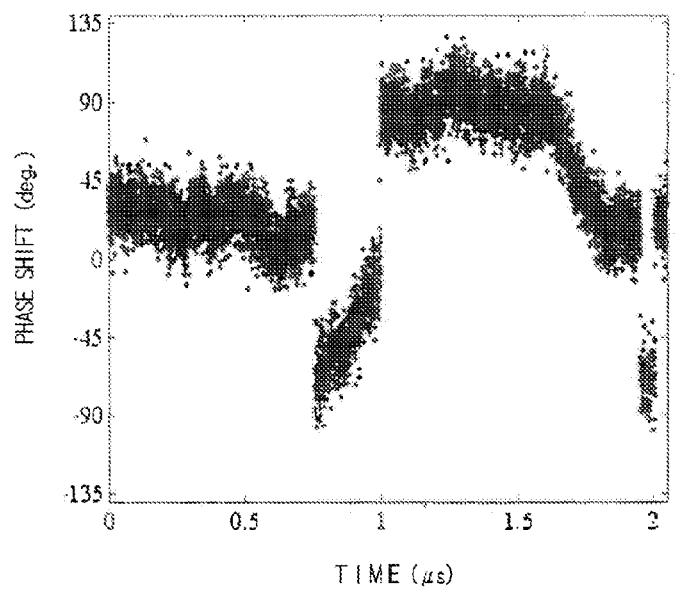
FIG. 6 is a diagram showing a time-varying phase shift example in a conventional configuration.

FIG. 3 shows a processing example of the statistical analysis method 234 which corrects the phase shift. Here, a processing example of the statistical analysis method 234 in a range of 0.750 μs to 0.765 μs in FIG. 6 with L=15 and x=2 is shown.

Figure 4:
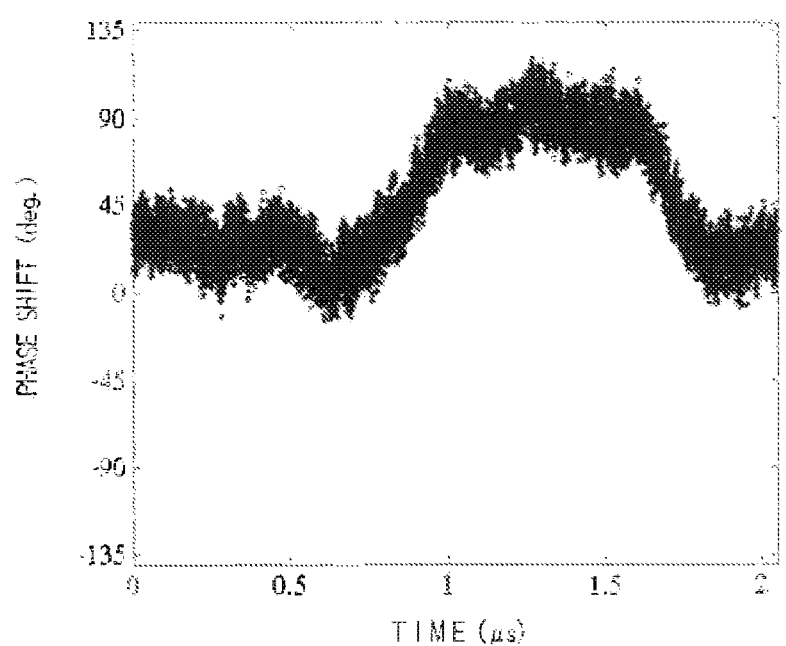
FIG. 4 is a diagram showing a time-varying phase shift example in the present application.

A point B of FIG. 3 is outside the range of "15-period moving average−2σ" of a point A due to a transient change of the phase shift, continuity of the phase shift is not maintained by error expansion of subsequent signal processing, and a cycle slip occurs. The point B is corrected to be within the range of "15-period moving average±2σ" at the point A in the above-described manner to suppress the transient change, whereby, as shown in FIG. 4, time continuity of the phase shift can be secured. In FIG. 3, a phase shift outside the range of "15-period moving average±2σ" like a point C subsequent to the point B is within the range of "15-period moving average±2σ" by correcting the point B to be within the range of "15-period moving average±2σ" at the point A.

In FIG. 4, a signal has a bit error rate (BER)=1.9×10⁻³, and signal quality is improved compared to BER=1.4×10⁻² when a cycle slip occurs.

The present invention can be applied to various kinds of digital signal processing for a time-varying digital signal as well as the time-varying phase shift in the phase shift compensator 232 of the digital signal processor 230 of the digital coherent receiver 200 shown in FIG. 1. For example, the present invention can be applied to suppressing transient changes during adaptive control of the tap coefficient of a FIR filter in the equalizer 231. The present invention can be applied to suppressing transient noise during sound signal processing.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An apparatus for mitigating the effects of transient change noise introduced into a transmission path of a transmitted signal comprising:
   a digital signal processor receptive of an input signal comprising the transmitted signal and the noise introduced into the transmission path, the digital signal processor being adapted to manipulate the input signal to produce a processed signal,
   the digital signal processor being programmed to:
   a. calculate from the input signal a moving average signal and to store the moving average signal;
   b. calculate from the input signal and from the stored moving average signal a standard deviation signal and to store the standard deviation signal;
   c. test whether the input signal falls outside a predetermined range obtained from the stored moving average signal and the stored standard deviation signal and, if so, to calculate and store a corrected signal that falls inside the predetermined range; and
   d. output the input signal as the processed signal if the input signal falls within the predetermined range, and to output the corrected signal as the processed signal if the input signal falls outside the predetermined range.

2. The apparatus according to claim 1, wherein the input signal is expressed as a discrete time signal comprising plural sample points that includes a current sample point, wherein the digital signal processor is programmed to calculate the moving average signal by calculating the average of a predetermined number of the plural sample points.

3. The apparatus according to claim 2, wherein the digital signal processor is programmed to calculate a pair of standard deviation values associated with each of the predetermined number of the plural sample points.

4. The apparatus according to claim 2, wherein the digital signal processor is programmed to test whether the current sample point falls outside the predetermined range and, if so, to calculate and store the corrected signal by using one of the pair of standard deviation points associated with the current sample point.

5. The apparatus according to claim 1, wherein the step of calculating a moving average signal is performed according to the following:
   establishing n as an integer equal to or greater than 3 and L as an integer equal to or greater than 2, the moving average calculation process inputs digital signals of L points in total from an (n−L)th digital signal S(n−L) to an (n−1)th digital signal S(n−1) and outputs a moving average A(n−1).

6. The apparatus according to claim 1, wherein the step of calculating a standard deviation signal is performed according to the following:
   establishing n as an integer equal to or greater than 3 and L as an integer equal to or greater than 2, the standard deviation calculation process inputs the digital signals of the L points to the (n−1)th digital signal and the moving average A(n−1) output from the moving average calculation process and outputs a standard deviation σ(n−1).

7. The apparatus according to claim 1, wherein the step of testing whether the input signal falls outside a predetermined range is performed according to the following:

establishing an integer number n;

inputing an n-th digital signal S(n), a moving average A(n−1), and a standard deviation σ(n−1); and performing the statistical decision/signal correction process by using an arbitrary positive number as x, to determine whether or not the digital signal S(n) is within a range of:

$A(n-1)-x\sigma(n-1) \leq S(n) \leq A(n-1)+x\sigma(n-1).$

\* \* \* \* \*

UNITED STATES PATENT AND TRADEMARK OFFICE
CERTIFICATE OF CORRECTION

PATENT NO. : 9,749,061 B2
APPLICATION NO. : 14/426054
DATED : August 29, 2017
INVENTOR(S) : Fukutaro Hamaoka et al.

It is certified that error appears in the above-identified patent and that said Letters Patent is hereby corrected as shown below:

On the Title Page

Item (87), "PCT Pub. No.:":
"WO2013/038121" should be -- WO2014/038121 --.

Signed and Sealed this
Thirteenth Day of February, 2018

Andrei Iancu
*Director of the United States Patent and Trademark Office*